(12) United States Patent
Brosnan et al.

(10) Patent No.: US 7,734,161 B2
(45) Date of Patent: Jun. 8, 2010

(54) IMAGE STABILIZATION WITH ADAPTIVE SHUTTER CONTROL

(75) Inventors: Michael John Brosnan, Fremont, CA (US); Alexander Schneider, Los Altos, CA (US); Robert Wilson, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 492 days.

(21) Appl. No.: 11/737,625

(22) Filed: Apr. 19, 2007

(65) Prior Publication Data

US 2008/0260366 A1 Oct. 23, 2008

(51) Int. Cl.
*G03B 17/00* (2006.01)
(52) U.S. Cl. .................................. 396/55; 348/208.16
(58) Field of Classification Search ............. 396/52–55; 348/208.99, 208.1, 208.2, 208.4, 208.12, 348/208.16
See application file for complete search history.

(56) References Cited

U.S. PATENT DOCUMENTS

| | | | |
|---|---|---|---|
| 2002/0121587 A1* | 9/2002 | Becht | 250/201.1 |
| 2005/0248660 A1* | 11/2005 | Stavely et al. | 348/208.16 |
| 2006/0131485 A1 | 6/2006 | Rosner et al. | |
| 2006/0187324 A1 | 8/2006 | Lin | |
| 2006/0203101 A1 | 9/2006 | Silsby | |
| 2006/0251410 A1 | 11/2006 | Trutna, Jr. | |
| 2007/0046782 A1 | 3/2007 | Helbing et al. | |
| 2007/0291154 A1* | 12/2007 | Moon et al. | 348/333.05 |
| 2007/0296821 A1 | 12/2007 | Kakkori | |

* cited by examiner

*Primary Examiner*—Melissa J Koval
*Assistant Examiner*—Autumn Parker

(57) ABSTRACT

An apparatus to facilitate image stabilization with adaptive shutter control is described. An embodiment of the apparatus includes an image sensor, a movement detector, and a shutter controller. The movement detector is coupled to the image sensor. The shutter controller is coupled to the movement detector. The image sensor is configured to obtain image data. The movement detector is configured to obtain movement measurement information during a shutter period having a predetermined duration. The shutter controller is configured to adjust the shutter period of a shutter based on the movement measurement information. The shutter controls the time the image sensor is responsive to light incident on the image sensor. Embodiments of the apparatus provide a smaller and less costly implementation for image stabilization.

20 Claims, 9 Drawing Sheets

IMAGE STABILIZATION WITH ADAPTIVE SHUTTER CONTROL

BACKGROUND OF THE INVENTION

Image blur is a common problem in photography and has a variety of causes such as focusing errors and motion of the imaged object. Motion of the camera relative to the imaged object is another source of image blur. Camera motion is also referred to as camera shake or hand shudder. When a person is holding a camera during exposure, camera shake causes image blurring, particularly during long exposure times and for image enlargement (e.g., using a zoom or telephoto lens). Camera shake is typical because human muscles naturally tremor at frequencies approximately in the range of 4-12 Hz. Additionally, small cameras such as cell phone cameras are particularly prone to camera shake because they are constructed of lightweight materials and are sometimes awkward to hold during operation.

In efforts to reduce image blur, imaging devices such as hand-held cameras typically implement some type of image stabilization technology. Image stabilization refers to reducing the effects of relative movement between an image sensor and an object being imaged. Conventional image stabilization techniques for still camera systems, as compared to video camera systems, typically involve movement measurements and complementary mechanical displacement of a lens or image sensor. Conventional camera systems typically use two or more gyroscopes (e.g., piezoelectric or microelectromechanical systems (MEMS) gyros) to measure the movement of the camera. Once the movement is measured, mechanical displacement systems physically move the image sensor in a manner to compensate for the movement of the camera. Other conventional systems physically move the camera lens to compensate for the detected camera movement. However these conventional mechanical systems are cost prohibitive and are often too large to be implemented in small camera systems such as cell phone cameras. Additionally, conventional mechanical systems are subject to mechanical failures.

SUMMARY OF THE INVENTION

Embodiments of an apparatus are also described. In one embodiment, the apparatus is an apparatus to facilitate image stabilization with adaptive shutter control. In one embodiment, the apparatus includes an image sensor, a movement detector, and a shutter controller. The movement detector is coupled to the image sensor. The shutter controller is coupled to the movement detector. The image sensor is configured to obtain image data. The movement detector is configured to obtain movement measurement information during a shutter period having a predetermined duration. The shutter controller is configured to adjust the shutter period of a shutter based on the movement measurement information. The shutter controls the time the image sensor is responsive to light incident on the image sensor. Embodiments of the apparatus provide a smaller and less costly implementation for image stabilization. Other embodiments of the apparatus are also described.

Embodiments of a method are also described. In one embodiment, the method is a method for image stabilization. An embodiment of the method includes opening a shutter of an image sensor at a commencement of a shutter period. The shutter period has a predetermined duration. The method also includes obtaining movement measurement information during the shutter period. The movement measurement information is indicative of a movement of the image sensor. The method also includes adjusting the shutter period based on the movement measurement information. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
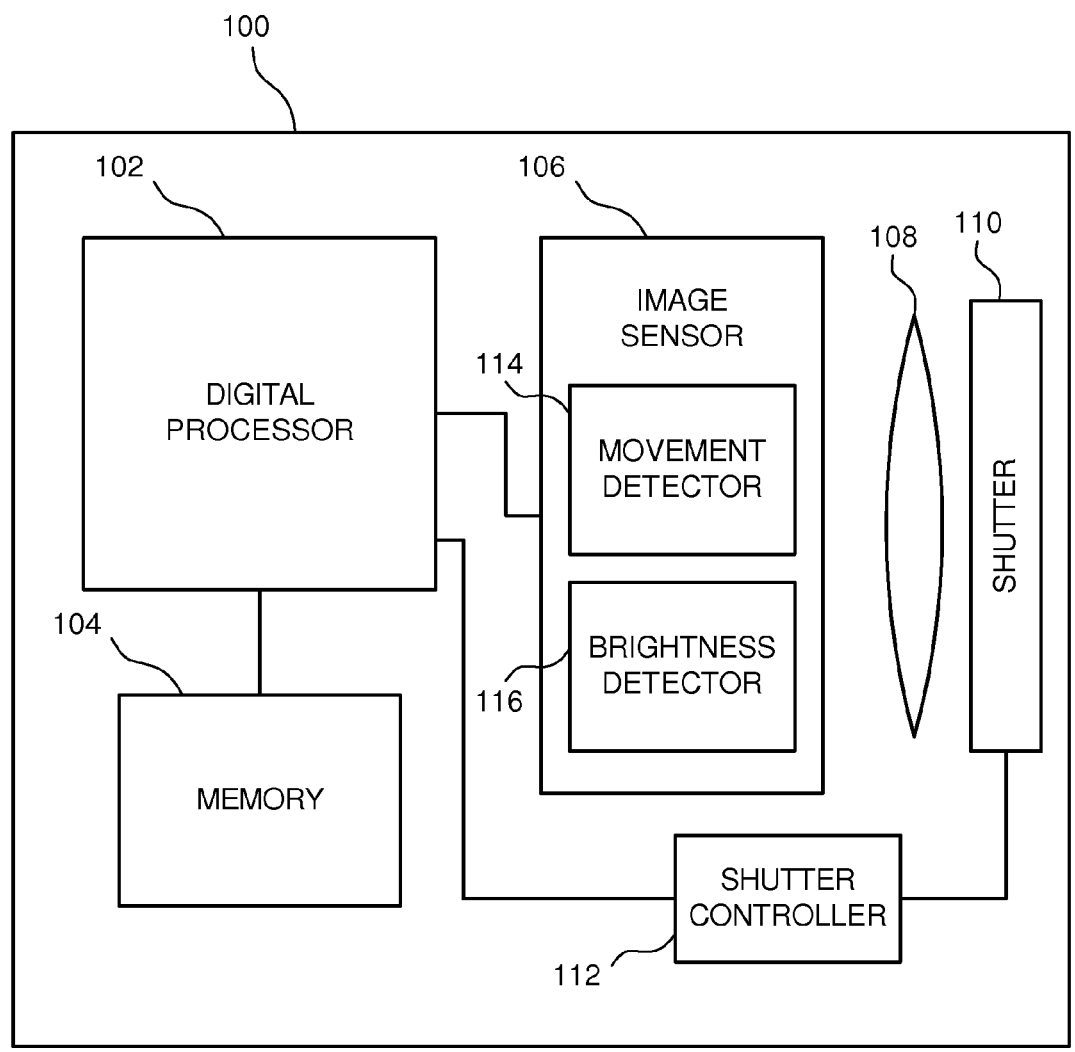
FIG. 1 depicts a schematic diagram of one embodiment of a camera system.

FIG. 1 depicts a schematic diagram of one embodiment of a camera system 100. The depicted camera system 100 includes a digital processor 102, an electronic memory device 104, an image sensor 106, a lens 108, a shutter 110, and a shutter controller 112. Although the various elements of the camera system 100 are shown in a particular arrangement, it should be noted that the depicted configuration is merely schematic and other embodiments may implement arrangements that are different from what is shown in FIG. 1. Additionally, some embodiments of the camera system 100 may include fewer or more elements than are shown in FIG. 1 and described below.

In one embodiment, the digital processor 102 facilitates execution of various instructions and operations which impart functionality to the camera system 100. These instructions may be stored within the digital processor 102, in the memory 104, or in another memory device within or coupled to the camera system 100. The memory 104 also stores images and other data used in connection with the various operations of the camera system 100.

In one embodiment, the image sensor 106 generates image data to represent an imaged object (not shown). The image sensor 106 may implement one or more sensor technologies such as charge-coupled device (CCD) technology, complementary metal-oxide-semiconductor (CMOS) technology, or another sensor technology. Typical implementations of these imaging technologies are known and are not described in more detail herein.

The depicted image sensor 106 includes a movement detector 114 and a brightness detector 116. Although the movement detector 114 and the brightness detector 116 are schematically shown within the image sensor 106, different embodiments of the image sensor 106 and the camera system 100 may use various types of movement detectors 114 and brightness detectors 116. For example, the movement detector 114 may be one or more piezoelectric or MEMS gyros. Alternatively, the movement detector 114 may be implemented using imaging technology, instead of gyros. Examples of motion detection using imaging technology are provided in U.S. Patent Publication No. 2006/0131485 to Rosner et al. and U.S. Patent Publication No. 2007/0046782 to Helbing et al. In one embodiment, the movement detector 114 generates movement measurement information to determine if the image sensor 106 moves relative to the imaged object during exposure. In other words, the movement detector 114 is configured to generate the movement measurement information based on image data from the image sensor 106. In another embodiment, at least some of the movement measurement information is based on image data obtained during the predetermined duration of the shutter period, as described below.

Although referred to as movement measurement information, the movement measurement information may or may not include actual measurement data. In one embodiment, the movement measurement information is a number or set of numbers indicative of the direction and/or displacement of the image sensor 106 relative to the imaged object. Some embodiments of the movement detector 114 calculate camera angular movement in pitch and yaw during image exposure in order to generate the movement measurement information. Additional details of embodiments of the movement detector 114 are described below.

In one embodiment, the image sensor 106 receives incident light via the optical lens 108 and/or the shutter 110. The optical lens 108 directs and focuses the light on the image sensor 106. In general, the shutter 110 regulates the time that the image sensor 106 is responsive to light incident on the image sensor 106. In some embodiments, the shutter 110 is a physical shutter 110 that opens and closes to block light from the image sensor 106. In other embodiments, the shutter is an electronic shutter 106 that regulates the time the image sensor 106 is responsive to incident light. It should be noted that there are many types of shutters 110 and optical lenses 108 (or compound lenses), and embodiments of the camera system 100 may use any combination of shutters 110 and/or lenses 108.

In one embodiment, the shutter controller 112 controls the operations of the shutter 110. For a physical shutter 110, the shutter controller 112 controls when the shutter 110 opens and closes. For an electronic shutter 110, the shutter controller 112 controls how long the image sensor 106 is responsive to incident light. The amount of light incident on the image sensor 106 is at least partially dependent on the amount of time the shutter 110 is open or the image sensor 106 is responsive to light. Allowing too much light through the shutter 110, or allowing the image sensor 106 to be responsive for too long, results in overexposure of the image, or an image that is too bright. Closing the shutter 110 before sufficient light has reached the image sensor 106, or activating the image sensor 106 for too short of a time, results in underexposure, or an image that is too dark. In one embodiment, the brightness detector 116 generates brightness information to determine the brightness of the resulting image. Additional details of embodiments of the brightness detector 116 are described below.

Additionally, movement of the camera system 100, including the image sensor 106, during exposure of the image sensor 106 to the incident light can cause image blur. In some embodiments, the shutter controller 112 is configured to adjust the shutter period of the shutter 110 based on the movement measurement information generated by the movement detector 114. Additional details of various embodiments of the of shutter controller 112 are described below with reference to the following figures.

Figure 2:
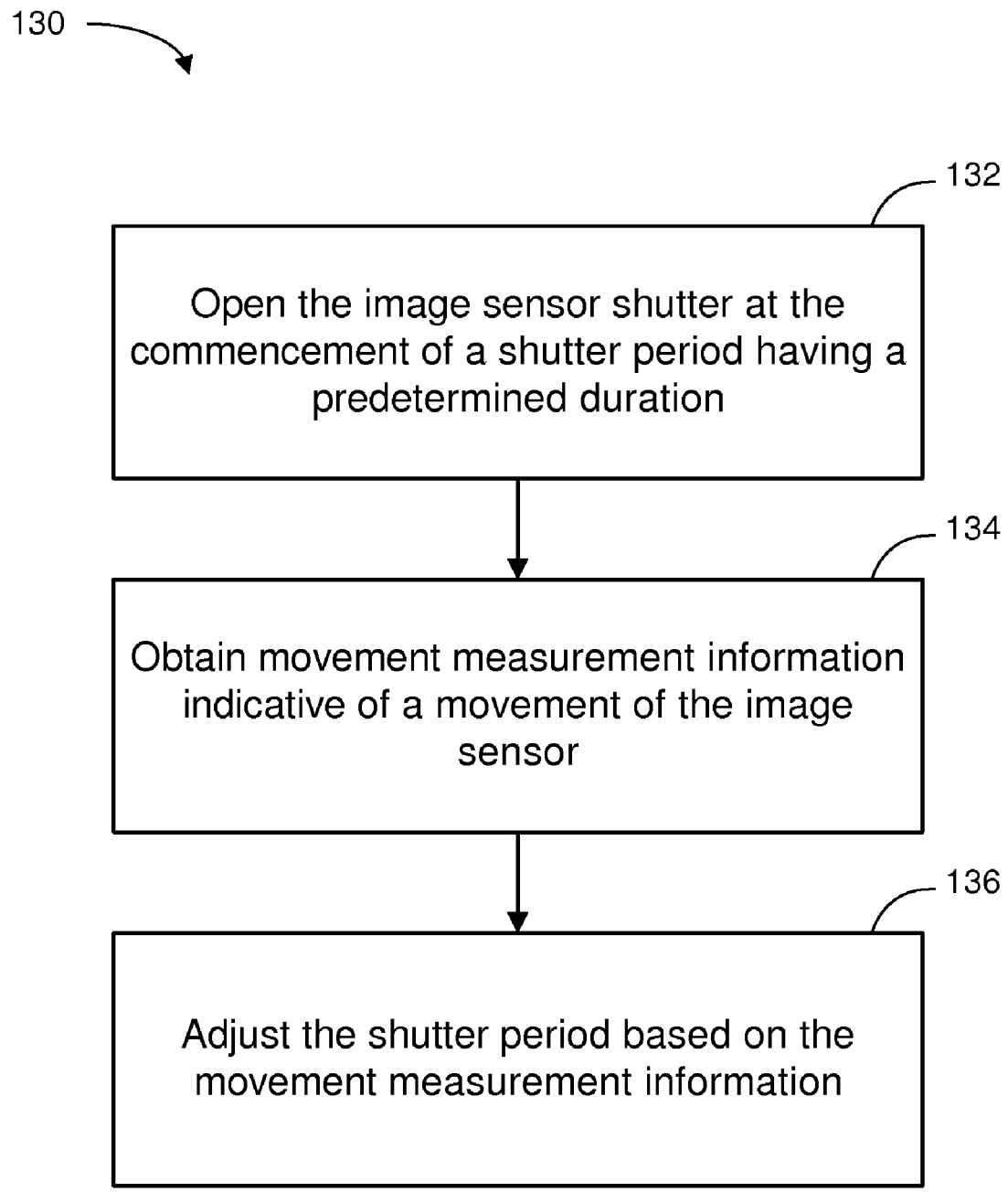
FIG. 2 depicts a schematic diagram of one embodiment of a method for implementing adaptive shutter control for image stabilization.

FIG. 2 depicts a schematic diagram of one embodiment of a method 130 for implementing adaptive shutter control for image stabilization. In one embodiment, the method 130 is implemented in conjunction with the camera system 100 of FIG. 1. Alternatively, some embodiments of the method 130 may be implemented with other types of camera systems.

At block 132, the shutter controller 112 opens the shutter 110 at the commencement of a shutter period. In one embodiment, the shutter period has a predetermined duration. The predetermined duration of the shutter period may be based on lighting conditions, user selections, shutter speed tables, and so forth. Each image, or picture, taken by the camera may have a unique shutter speed (i.e., how fast the shutter 110 opens and closes, or how long the image sensor 106 is responsive) that is predetermined before the shutter 110 is opened to capture a particular image.

At block 134, the movement detector 114 obtains movement measurement information indicative of a movement of the image sensor 106. In one embodiment, the movement detector 114 constantly monitors the position of the image sensor 106 during an exposure time when the shutter 110 is open. Alternatively, the movement detector 114 may periodically monitor the position of the image sensor 106 during an exposure time.

At block 136, the shutter controller 112 adjusts the shutter period based on the movement measurement information from the movement detector 114. In other words, the shutter controller 112 may, for example, close a physical shutter 110 before expiration of the predetermined shutter period. Alternatively, the shutter controller 112 may deactivate an electronic shutter 110 before expiration of the predetermined shutter period. Since the actual shutter period may be different from the predetermined shutter period, the actual shutter period is also referred to herein as the original shutter period. One reason for adjusting the shutter period is to limit or minimize image blur of the resulting image. Another possible reason for adjusting the shutter period is to control exposure in order to generate an image that is neither too bright nor too dark. Controlling exposure also may be used to facilitate contrast equalization.

Figure 3:
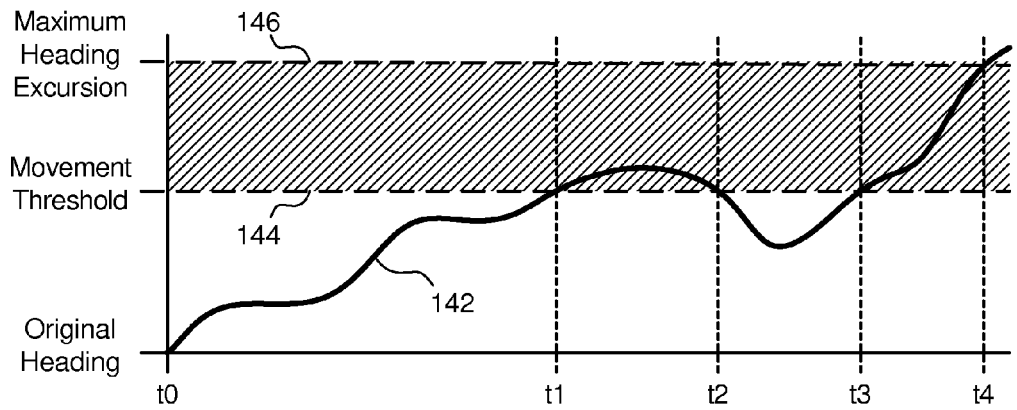
FIG. 3 depicts a schematic wave diagram of one embodiment of movement measurement information.

FIG. 3 depicts a schematic wave diagram of one embodiment of movement measurement information. The movement measurement information is represented by a movement measurement signal 142 indicative of the movement of the image sensor 106 relative to an imaged object. Although a single movement measurement signal 142 is shown in the wave diagram of FIG. 3, some embodiments of the camera system 100 may operate using additional movement measurement signals, or other types of movement measurement information.

The movement measurement signal 142 is shown relative to an original heading, a movement threshold 144 and a maximum heading excursion 146. An original heading of the movement measurement signal 142 indicates the original position of the image sensor 106 relative to the imaged object. In one embodiment, any movement from this original position is quantified and represented by the movement measurement signal 142. This includes displacement, as well as angular translation. Other embodiments may use some, but not all, movement components (e.g., pitch and yaw) to generate the movement measurement signal 142.

The movement threshold 144 represents a threshold that is established to maintain image blur within an acceptable limit. In one embodiment, movement of the image sensor 106 does not create significant image blur as long as the movement is less than the movement threshold 144. The maximum heading excursion 146 represents a maximum movement of the image sensor 106 that will be tolerated for a single image.

The difference between the movement threshold 144 and the maximum heading excursion 146 is in the operation of the shutter controller 112. In one embodiment, the shutter controller 112 allows exposure while the movement measurement signal 142 is below the movement threshold 144, but does not allow exposure once the movement measurement signal 142 is above the movement threshold 144. For example, the movement measurement signal 142 begins at the original heading at time t0 and increases until it exceeds the movement threshold 144 at time t1. The movement measurement signal 142 remains above the movement threshold 144 until time t2 when it returns below the movement threshold 144. At time t3, the movement measurement signal 142 exceeds the movement threshold 144, again. In one embodiment, the possible exposure times include the interval between time t0 and t1 and the interval between times t2 and t3.

Some embodiments of the shutter controller 112 continue a monitoring period while the movement measurement signal 142 is between the movement threshold 144 and the maximum heading excursion 146 (e.g., between times t2 and t3) to see if the movement measurement signal 142 drops back down below the movement threshold 144 (e.g., at time t3). If so, the shutter controller 112 may reopen or reactivate the shutter 110 to accumulate an image signal including multiple exposure times (e.g., between times t0 and t1 and between times t2 and t3). Once the movement measurement signal 142 exceeds the maximum heading excursion 146, the monitoring period ends. For example, the movement measurement signal 142 exceeds the maximum heading excursion 146 at time t4. The examples shown in FIGS. 4 through 11 illustrate several possible scenarios in more detail. Each of the examples in FIGS. 4 through 9 relate to the movement measurement signal 142 shown in FIG. 3. The example shown in FIG. 11 relates to the movement measurement signal 142 shown in FIG. 10.

Figure 4:
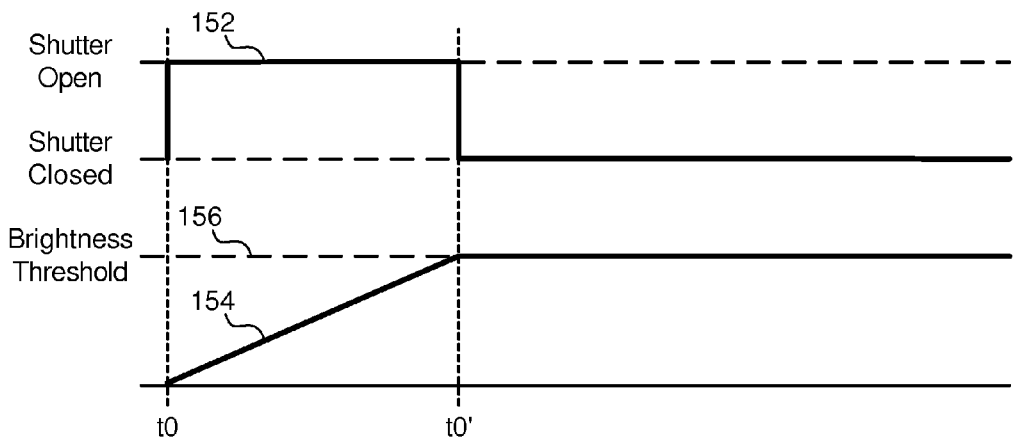
FIG. 4 depicts a schematic wave diagram of one embodiment of a shutter control signal and a brightness signal.

FIG. 4 depicts a schematic wave diagram of one embodiment of a shutter control signal 152 and a brightness signal 154. The shutter control signal 156 illustrates when the shutter 110 is open or active (shown as a logical HIGH level) and when the shutter 110 is closed or not active (shown as a logical LOW level). In one embodiment, the shutter controller 112 generates the shutter control signal 152. Additionally, the brightness signal 154 varies up to a brightness threshold 156. In one embodiment, the brightness signal 154 is generated by the brightness detector 116. Although some intervals of the brightness signal 154 are shown as linear, analog segments, embodiments of the brightness detector 116 may generate non-linear and/or digital signals to represent the brightness of the accumulated charge at the image sensor 106.

The shutter control signal 152 and the brightness signal 154 of FIG. 4 illustrate a situation in which the shutter 110 is opened or activated at time t0 and closed or deactivated at time t0' (before time t1), when the brightness signal 154 reaches the brightness threshold 156. In one embodiment, the brightness signal 154 reaches the brightness threshold 156 before the predetermined shutter period expires, so the shutter controller 112 closes or deactivates the shutter 110 before expiration of the predetermined shutter period. Alternatively, the brightness signal 154 may reach the brightness threshold 154 after the predetermined shutter period expires, so the shutter controller 112 keeps the shutter 110 open or active until after expiration of the predetermined shutter period. In another embodiment, the shutter controller 112 closes or deactivates the shutter 110 precisely when the predetermined shutter period expires. In each of these scenarios, the state of the shutter 110 (i.e., open or closed) is not affected by the movement of the image sensor 106 because the movement measurement signal 142 is within the movement threshold 144.

Figure 5:
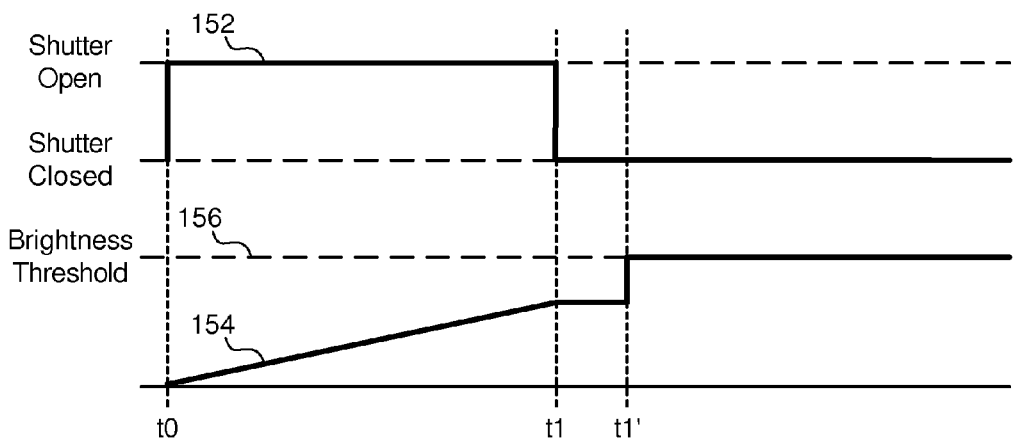
FIG. 5 depicts a schematic wave diagram of another embodiment of a shutter control signal and a brightness signal.

FIG. 5 depicts a schematic wave diagram of another embodiment of a shutter control signal 152 and a brightness signal 154. The shutter control signal 152 and the brightness signal 154 of FIG. 5 illustrate a situation in which the shutter 110 opens or is activated at time t0 and closes or is deactivated at time t1, when the movement measurement signal 142 exceeds the movement threshold 144. However, since the brightness signal 154 does not reach the brightness threshold 156 in this same time period, the brightness detector 116 boosts the brightness signal 154 to a target brightness approximately equal to the brightness threshold. The brightness detector 116 boosts the brightness signal 154 at time t1' (shortly after time t1). In one embodiment, the brightness detector 116 uses contrast equalization to raise the brightness signal 154 to the target brightness. This scenario assumes that the movement measurement signal 142 exceeds the movement threshold 144 prior to expiration of the predetermined shutter period. In this way, the interval between time t0 and t1 (the time that the shutter 110 is actually open) is designated the original shutter period.

Figure 6:
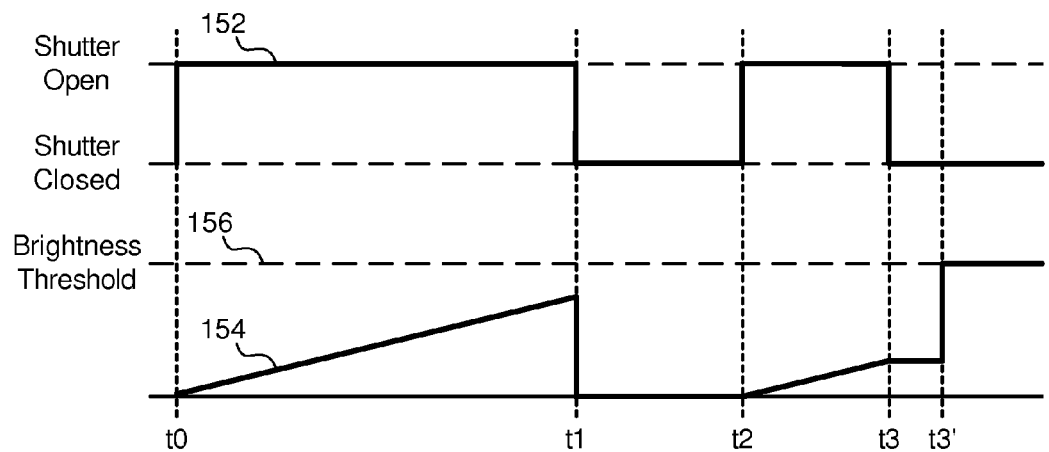
FIG. 6 depicts a schematic wave diagram of another embodiment of a shutter control signal and a brightness signal.

FIG. 6 depicts a schematic wave diagram of another embodiment of a shutter control signal 152 and a brightness signal 154. The shutter control signal 152 and the brightness signal 154 of FIG. 6 illustrate a situation in which the shutter 110 opens or is activated at time t0 and closes or is deactivated at time t1 when the movement measurement signal 142 exceeds the movement threshold 144. This is similar to the situation shown in FIG. 5. However, instead of using the original image, the original image is discarded and a new image is obtained during a reduced shutter period that is much shorter than the original shutter period. For example, the original image obtained between times t0 and t1 is discarded, and the new image obtained between times t2 and t3 is used. Although the start and stop times of the replacement image coincide with times that the movement measurement signal 142 is below the movement threshold 144 (e.g., between times t2 and t3), other embodiments may obtain the replacement image at arbitrary times with respect to the movement measurement signal 142 (e.g., see FIG. 7).

Since the brightness of the replacement image is much lower than the brightness of the original image, the brightness detector 116 raises the brightness of the replacement image to the target brightness, for example, using contrast equalization. The brightness detector 116 boosts the brightness signal 154 at time t3' (shortly after time t3). This scenario assumes that the predetermined shutter period does not expire prior to time t3.

Figure 7:
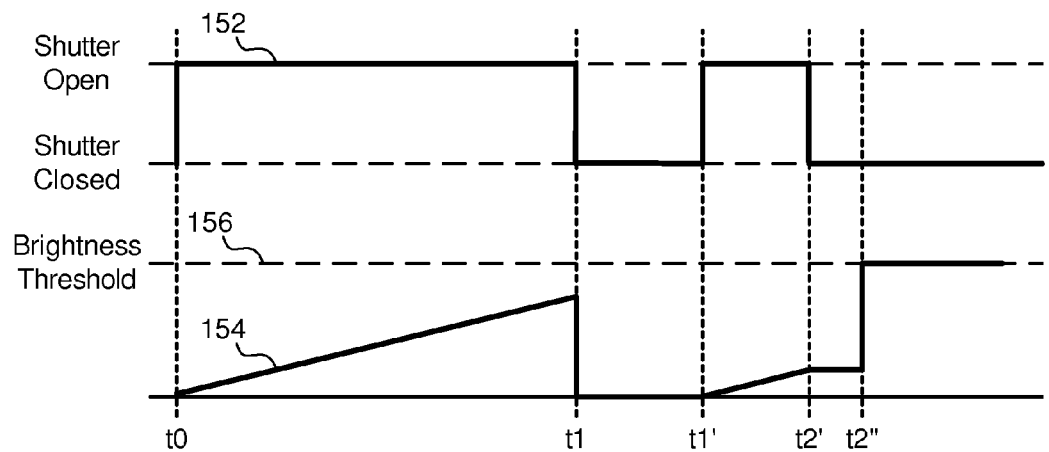
FIG. 7 depicts a schematic wave diagram of another embodiment of a shutter control signal and a brightness signal.

FIG. 7 depicts a schematic wave diagram of another embodiment of a shutter control signal 152 and a brightness signal 154. The shutter control signal 152 and the brightness signal 154 of FIG. 7 illustrate a situation which is substantially similar to the situation illustrated in FIG. 6. However, the times that the shutter 110 reopens or reactivates and closes or deactivates for the replacement image are not aligned with the movement measurement signal 142 crossing the movement threshold 144. In some embodiments, it is not necessary to coordinate the replacement image with the movement threshold 144 of the original image because once the shutter reopens (e.g., at time t1') the original heading of the movement measurement signal 142 is effectively reset to whatever position the image sensor 106 is in at the time the shutter 110 reopens or reactivates. Hence, the original shutter period (e.g., the interval between times t0 and t1) is replaced with a subsequent, reduced shutter period (e.g., the interval between times t1' and t2').

Figure 8:
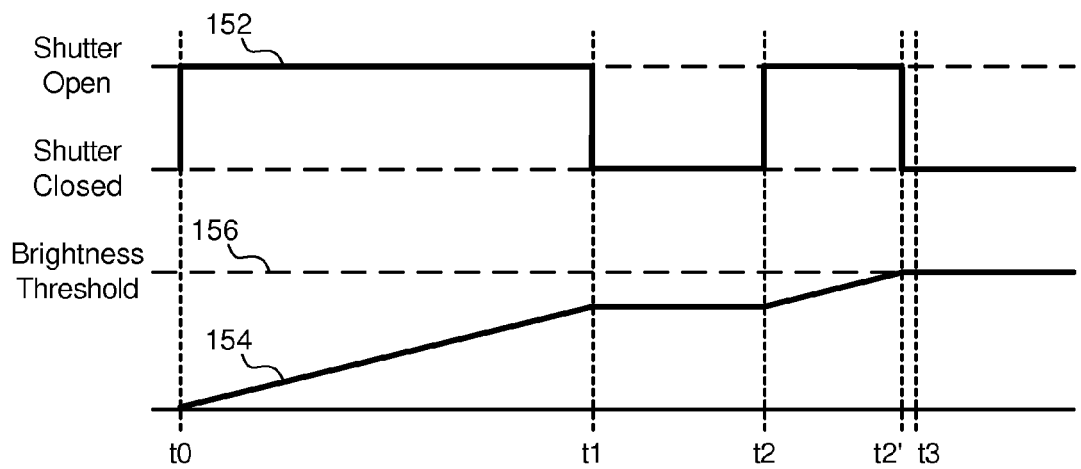
FIG. 8 depicts a schematic wave diagram of another embodiment of a shutter control signal and a brightness signal.

FIG. 8 depicts a schematic wave diagram of another embodiment of a shutter control signal 152 and a brightness signal 154. The shutter control signal 152 and the brightness signal 154 of FIG. 8 illustrate a situation in which the shutter 110 opens or activates at time t0 and closes or deactivates at time t1 when the movement measurement signal 142 exceeds the movement threshold 144. Then, the shutter 110 reopens or reactivates at time t2 when the movement measurement signal 142 returns below the movement threshold 144. This is similar to the situation shown in FIG. 6. However, instead generating a replacement image to replace the original image, the image sensor 106 accumulates an image signal (represented by the brightness signal 154) to increase the original signal obtained during the original shutter period between times t0 and t1. In other words, the image sensor 106 adds the new image signal obtained during the interval between times t2 and t3 to the original image signal obtained during the interval between times t0 and t1. This increases the overall image signal. Since the position of the image sensor 106 is near the original heading, reopening or reactivating the shutter 110 at this position is unlikely to result in substantial image blur. When the brightness signal 154 reaches the brightness threshold 156 at time t2', the shutter controller 112 closes or deactivates the shutter 110.

It should be noted that the scenarios of reopening the shutter 110 to generate a replacement image (see FIGS. 6 and 7) or to accumulate an increased image signal (see FIG. 8) do not necessarily correlate to the predetermined shutter period. In some embodiments, the predetermined shutter period may be ignored because the intermediate closing or deactivation of the shutter 110 (e.g., between times t1 and t2) renders the predetermined shutter period virtually meaningless. However, other embodiments of the shutter controller 112 may continue to monitor the predetermined shutter period, either continually through the times when the shutter 110 is closed or deactivated, or cumulatively for the selected times when the shutter 110 is open or active.

Figure 9:
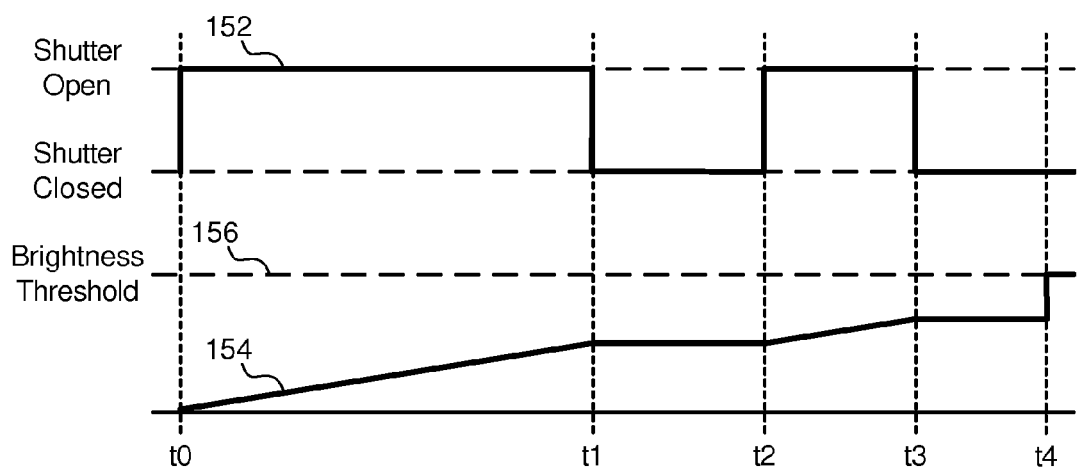
FIG. 9 depicts a schematic wave diagram of another embodiment of a shutter control signal and a brightness signal.

FIG. 9 depicts a schematic wave diagram of another embodiment of a shutter control signal 152 and a brightness signal 154. The shutter control signal 152 and the brightness signal 154 of FIG. 9 illustrate a situation which is substantially similar to the situation illustrated in FIG. 8. However, the brightness signal 154 increases at a lower rate for the scenario shown in FIG. 9. Because of this lower brightness, the brightness signal 154 does not reach the brightness threshold before time t4, at which time the movement measurement signal 142 exceeds the maximum heading excursion 146. Once the movement measurement signal 142 exceeds the maximum heading excursion 146, the shutter controller 112 stops waiting for the movement measurement signal 142 to return below the movement threshold 144 since the displacement of the image sensor 106 is relatively large, and the likelihood of the movement measurement signal 142 returning below the movement threshold 144 becomes remote.

Since the brightness signal 154 does not reach the target brightness at approximately the brightness threshold 156, the brightness detector 116 raises the brightness of the accumulated image to the target brightness, for example, using contrast equalization. In the depicted embodiment, the brightness detector 116 raises the brightness signal 154 at time t4 when the movement measurement signal 142 exceeds the maximum heading excursion.

Figure 10:
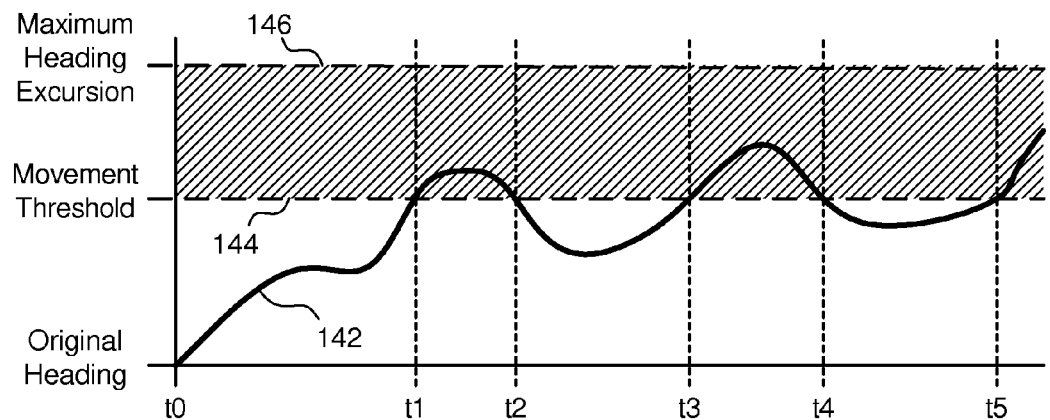
FIG. 10 depicts a schematic wave diagram of another embodiment of the movement measurement signal.

FIG. 10 depicts a schematic wave diagram of another embodiment of the movement measurement signal 142. In many aspects, the movement measurement signal 142 of FIG. 10 is substantially similar to the movement measurement signal 142 of FIG. 3. However, the movement measurement signal 142 of FIG. 10 alternates above and below the movement threshold 144 without exceeding the maximum heading excursion 146. In particular, the movement measurement signal 142 exceeds the movement threshold 144 at time t1, returns below the movement threshold 144 at time t2, exceeds the movement threshold at time t3, returns below the movement threshold at time t4, and exceeds the movement threshold 144 at time t5. This illustrates a potentially oscillatory camera motion which may result from certain imaging applications or environments.

Figure 11:
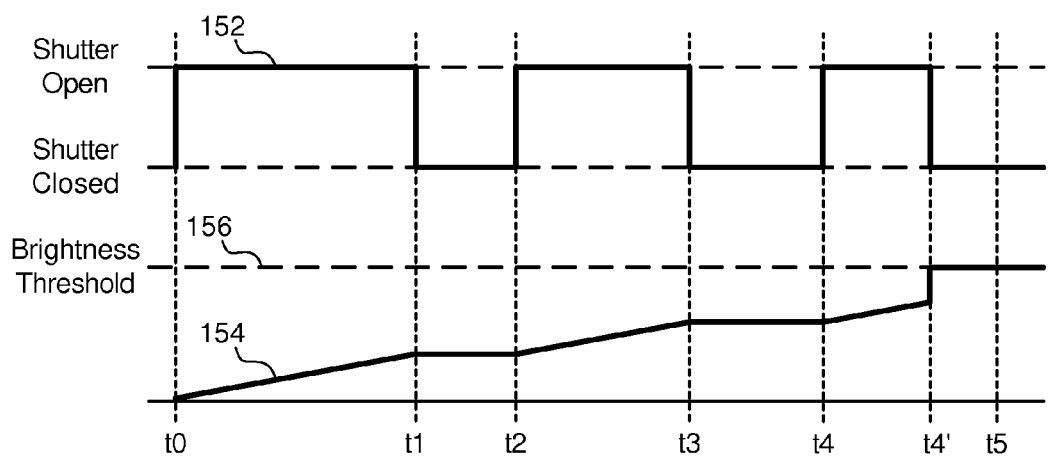
FIG. 11 depicts a schematic wave diagram of another embodiment of a shutter control signal and a brightness signal.

FIG. 11 depicts a schematic wave diagram of another embodiment of a shutter control signal 152 and a brightness signal 154. The shutter control signal 152 and the brightness signal 154 of FIG. 11 illustrate a situation in which a monitoring period expires before the brightness signal 154 reaches the brightness threshold 156. In one embodiment, the monitoring period is a continuous interval starting at time t0 and set to expire after a set amount of time has passed. The monitoring period assures that the camera will exit the image generation state in a timely manner, even though the position of the image sensor 106 does not change significantly. The monitoring period may be useful where the imaged object and surrounding environment is relatively dark so the brightness signal 154 increases very slowly, and the image sensor 106 remains relatively still.

In the depicted embodiment, the monitoring period expires at time t4' (between times t4 and t5). Since the brightness signal 154 does not reach the target brightness by the time the monitoring period expires, the brightness detector 116 raises the brightness of the accumulated image to the target brightness, for example, using contrast equalization. In the depicted embodiment, the brightness detector 116 raises the brightness signal 154 at time t4' when the monitoring period expires. FIG. 11 also shows a scenario in which the image signal accumulates over more than two exposure times when the shutter 110 is open or active.

Figure 12:
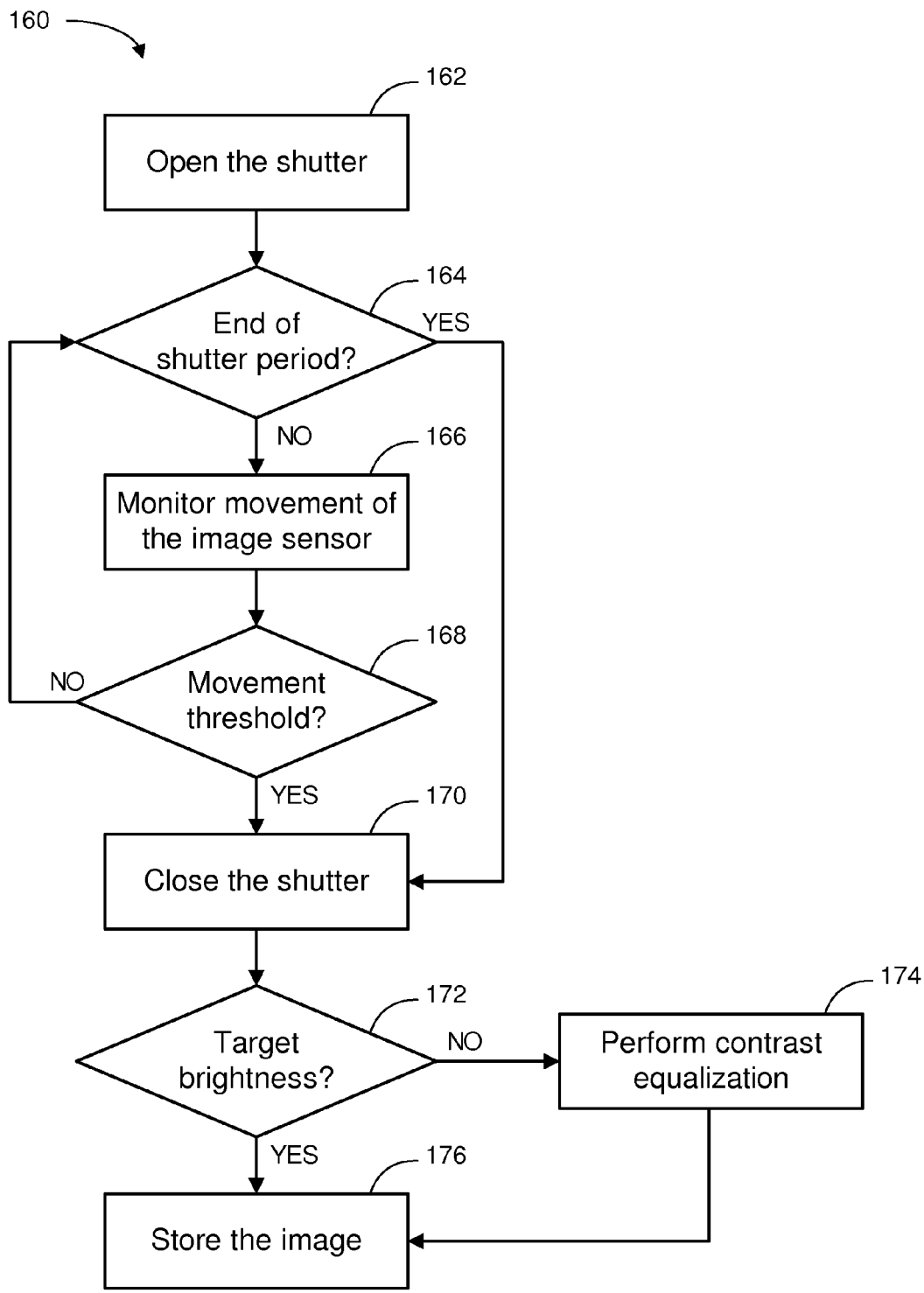
FIG. 12 depicts a schematic flow chart diagram of another embodiment of a method for image stabilization using adaptive shutter control.

FIG. 12 depicts a schematic flow chart diagram of another embodiment of a method 160 for image stabilization using adaptive shutter control. In one embodiment, the method 160 is implemented in conjunction with the camera system 100 of FIG. 1. Alternatively, some embodiments of the method 160 may be implemented with other types of camera systems.

At block 162, the shutter controller 112 opens the shutter 110. In one embodiment, the shutter controller 112 opens or activates the shutter 110 in response to an instruction from the digital processor 102 after the digital processor 102 receives an input from a user. At block 164, the shutter controller 112 determines if a shutter period has expired. In one embodiment, the shutter period is a predetermined shutter period, as described above. In another embodiment, the shutter period is a reduced shutter period, as described above.

If the applicable shutter period has not expired, then at block 166 the movement detector 114 monitors the movement of the image sensor 106. Various types of movement monitoring techniques are described above. At block 168, the movement detector 114 determines if the image sensor 106 has moved beyond a movement threshold 144. In one embodiment, the movement measurement information indicates whether or not a movement of the image sensor 106 exceeds the movement threshold 144.

If the movement threshold 144 is not exceeded, then the shutter controller 112 again determines if the shutter period has expired. In one embodiment, this loop continues until either the shutter period expires or the movement threshold 144 is crossed. If the movement threshold 144 is exceeded, or after the shutter period expires, then at block 170 the shutter controller 112 closes or deactivates the shutter 110. The shutter controller 112 also closes or deactivates the shutter 110 in response to a determination that the shutter period has been exceeded.

After the shutter 110 is closed or deactivated, then at block 172 the brightness detector 116 determines if the target brightness is achieved. If the target brightness is not achieved, then at block 174 the brightness detector 116 performs contrast equalization to increase the brightness of the image. Otherwise, if the target brightness is achieved, or after the brightness detector 116 raises the brightness of the image, then at block 176 the image is stored, for example, in the memory 104. The depicted method 160 then ends.

Figure 13:
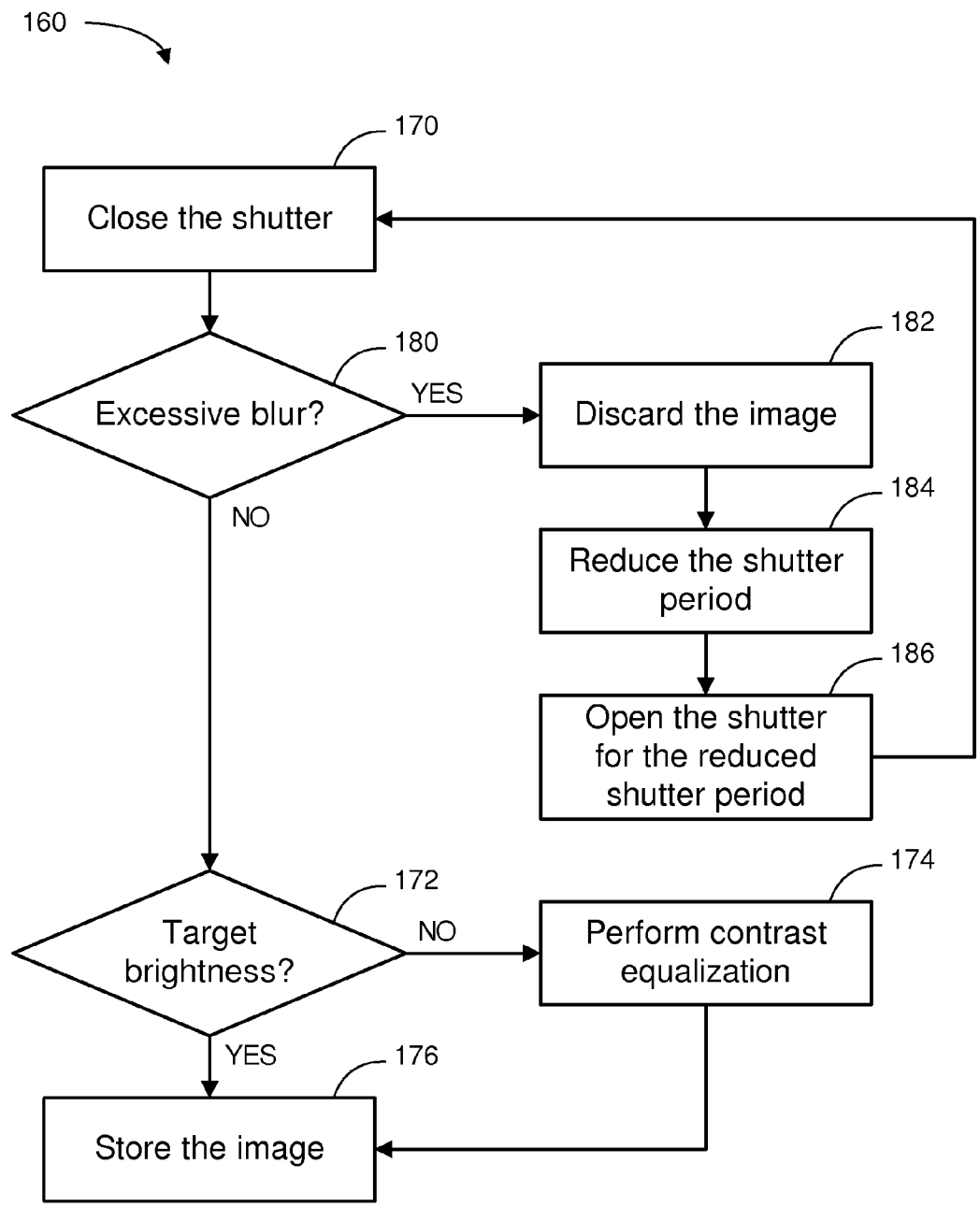
FIG. 13 depicts a schematic flow chart diagram of another embodiment of the method for image stabilization using adaptive shutter control shown in FIG. 12.

FIG. 13 depicts a schematic flow chart diagram of another embodiment of the method 160 for image stabilization using adaptive shutter control shown in FIG. 12. For convenience and clarity, the operations 162-168 are not shown in FIG. 13, and the operations 170-176 are the same as described above with reference to FIG. 12.

In one embodiment, after the shutter controller 112 closes or deactivates the shutter 110, then at block 180 the image sensor 106 determines if the image suffers from excessive blurring. In one embodiment, the movement detector 114 may determine if the image includes excessive blurring. If the image does not include excessive blurring, then the method continues with the operations 172-176, as described above.

However, if the movement detector 114 determines that the image is blurry, then at block 182 the image sensor 106 clears the image signal to discard the original image. At block 184, the shutter controller 180 reduces the shutter period from the predetermined shutter period to the reduced shutter period and, then at block 186 the shutter controller 112 then opens or activates the shutter 110 for the reduced shutter period. Reopening or reactivating the shutter 110 in this manner generates a replacement image to replace the original image. The shutter controller 112 then closes or deactivates the shutter 110, again, and repeats the operations described above. This method 160 may continue until an acceptable image is obtained or until a monitoring or other time period expires. The depicted method 160 then ends.

Figure 14:
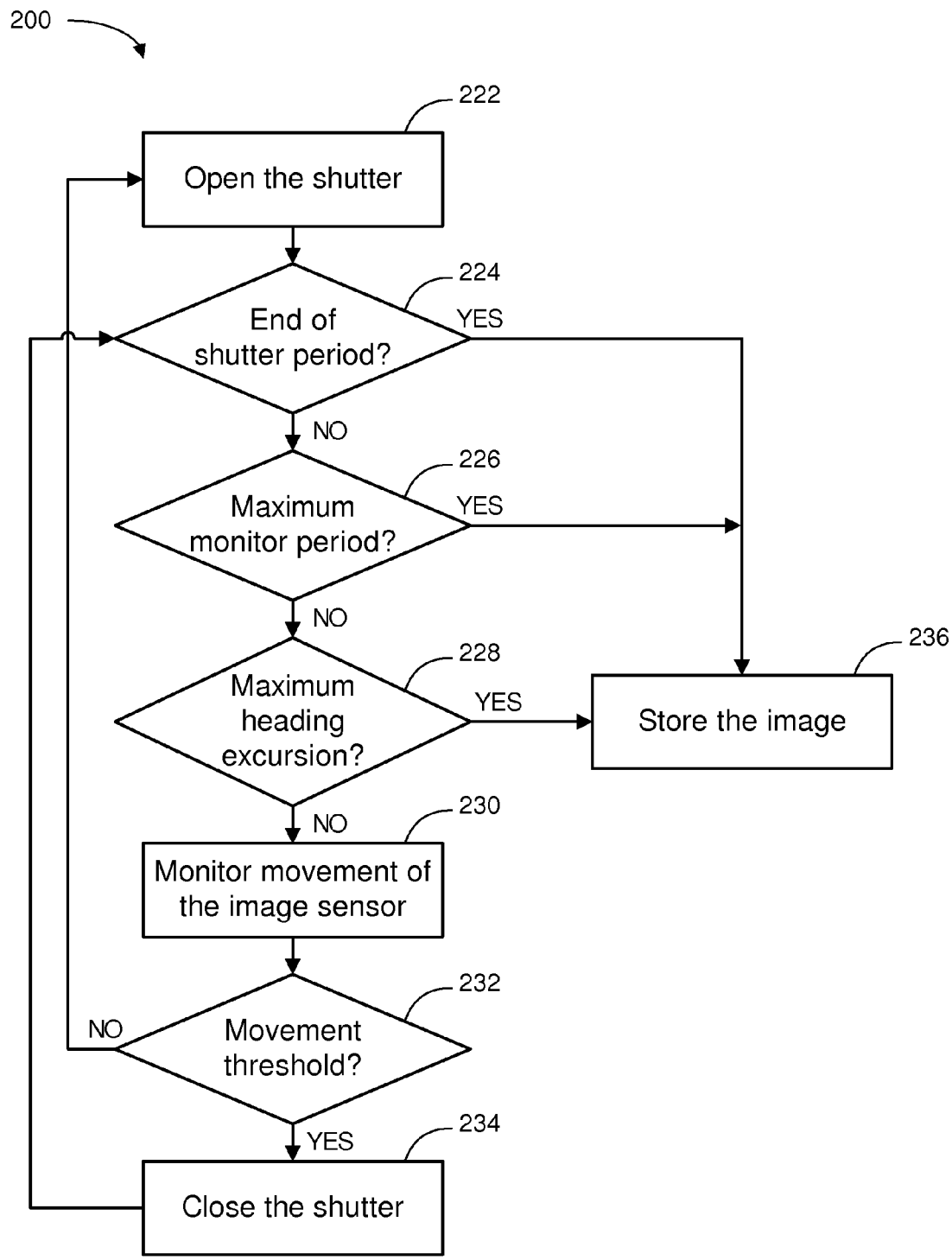
FIG. 14 depicts a schematic flow chart diagram of another embodiment of a method for image stabilization using adaptive shutter control.

FIG. 14 depicts a schematic flow chart diagram of another embodiment of a method 200 for image stabilization using adaptive shutter control. In one embodiment, the method 200 is implemented in conjunction with the camera system 100 of FIG. 1. Alternatively, some embodiments of the method 200 may be implemented with other types of camera systems.

At block 222, the shutter controller 112 opens or activates the shutter 222 to generate an image. At block 224, the shutter controller 112 determines if a shutter period such as the predetermined shutter period has expired. If the appropriate shutter period has not expired, then at block 226 the shutter controller 112 determines if a maximum monitoring period has expired, as described above. If the maximum monitoring period has not expired, then at block 228 the movement detector determines if the movement measurement information exceeds a maximum heading excursion 146, as described above.

If the maximum heading excursion 146 has not been crossed, then at block 230 the movement detector 114 monitors the movement measurement information. At block 232, the movement detector 114 determines if the movement measurement information exceeds the movement threshold 144. If the movement measurement information does not exceed the movement threshold 144, then the shutter controller 112 opens or activates the shutter 110. It should be noted that the phrase "open the shutter" should be understood to include keeping a physical shutter 110 open if the shutter 110 is already open. Additionally, the phrase "open the shutter" also includes the equivalent operations for an electronic shutter 110. The operations described above continue in the manner outlined until one of the determinations ends the loop.

If the movement measurement information does exceed the movement threshold 144, then at block 234 the shutter controller 112 closes or deactivates the shutter 110. It should be noted that the phrase "close the shutter" should be understood to include keeping a physical shutter 110 closed if the shutter 110 is already closed. Additionally, the phrase "close the shutter" also includes the equivalent operations for an electronic shutter 110. The operations described above continue until one of the determinations ends the loop. In this way, the shutter controller 112 continues to open or activate the shutter 110 when the movement measurement information is below the movement threshold 144 and to close or deactivate the shutter 110 when the movement measurement information is above the movement threshold 144. Each time the shutter controller 112 reopens or reactivates the shutter 110, a new exposure time begins and the image signal accumulates.

Once the shutter period ends, the monitoring period ends, or the maximum heading excursion 146 is exceeded, then at block 236 the image sensor 106 stores the image, for example, in the memory 104. The depicted method 200 then ends.

It should be noted that embodiments of the camera system 100 and similar camera systems may be implemented in a variety of imaging applications. For example, embodiments of the camera system 100 may be used in digital still cameras, mobile phone cameras, single lens reflex (SLR) cameras, and so forth. Additionally, embodiments of the camera system 100 may be operated by a human or by an automated operator. For example, a human may operate a camera system integrated into a cell phone. Alternatively, an automated operator may operate a camera system used for security cameras in high vibration environments.

It should also be noted that the terms "open" and "activate" are used, sometimes interchangeably, to refer generally to initiation of a shutter period. Similarly, the terms "close" and "deactivate" are used, sometimes interchangeably, to refer generally to termination of a shutter period. The description herein of a particular embodiment opening and closing a shutter does not necessarily exclude the embodiment, or a similar embodiment, from implementing an electronic shutter. Moreover, the description herein of a particular embodiment activating and deactivating a shutter does not necessarily exclude the embodiment, or a similar embodiment, from implementing a physical shutter. In at least some of the uses, the terms "activate" and "deactivate" encompass the opening and closing of a physical shutter.

Some embodiments of the camera system 100 provide increased performance compared to conventional camera systems. For example, some embodiments provide a better signal-to-noise ratio (SNR). Additionally, some embodiments maintain image blur at acceptable levels despite unfavorable operation conditions.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus to facilitate image stabilization with adaptive shutter control, the apparatus comprising:
    an image sensor to obtain image data;
    a movement detector coupled to the image sensor, the movement detector configured to obtain movement measurement information during a shutter period having a predetermined duration; and
    a shutter controller coupled to the movement detector, the shutter controller configured to adjust the shutter period of a shutter based on the movement measurement information, wherein the shutter controls a time the image sensor is responsive to light incident on the image sensor by deactivating the shutter in response to a determination that the image sensor moves beyond a movement threshold and reactivating the shutter in response to a determination that the image sensor returns within the movement threshold.

2. The apparatus of claim 1 wherein the shutter controller is further configured to deactivate the shutter prior to expiration of the predetermined duration of the shutter period.

3. The apparatus of claim 1 wherein the movement detector is further configured to determine if the image sensor moves beyond a movement threshold.

4. The apparatus of claim 3 wherein the movement detector is further configured to determine if the image sensor moves beyond a maximum heading excursion, wherein the maximum heading excursion is larger than the movement threshold and represents a maximum movement of the image sensor that will be tolerated for a single image.

5. The apparatus of claim 3 wherein the movement detector is further configured to determine if the image sensor returns within the movement threshold prior to moving beyond a maximum heading excursion.

6. The apparatus of claim 1 wherein the movement detector is further configured to generate the movement measurement information based on the image data from the image sensor.

7. The apparatus of claim 1 wherein the image sensor is further configured to store an original image from at least a portion of the predetermined duration of the shutter period, and to store a replacement image from a subsequent reduced shutter period having a shorter duration than an original duration corresponding to the original image.

8. The apparatus of claim 1 wherein the movement detector is further configured to identify a plurality of separate exposure times for a single image based on the movement measurement information, and the image sensor is further configured to accumulate an image signal for the single image over the plurality of separate exposure times.

9. The apparatus of claim 1 further comprising a brightness controller coupled to the image sensor, the brightness controller configured to generate brightness information, wherein the shutter controller is further configured to deactivate the shutter in response to a determination that the brightness information exceeds a brightness threshold.

10. The apparatus of claim 9 wherein the brightness controller is further configured to perform contrast equalization on an image in response to a determination that the brightness information is below a brightness threshold.

11. A method for image stabilization, the method comprising:
    activating a shutter of an image sensor at a commencement of a shutter period, the shutter period having a predetermined duration;
    obtaining movement measurement information during the shutter period, the movement measurement information indicative of a movement of the image sensor; and
    adjusting the shutter period based on the movement measurement information, wherein adjusting the shutter period comprises:
        deactivating the shutter of the image sensor in response to a determination that the movement measurement information exceeds a movement threshold; and
        reactivating the shutter of the image sensor in response to a determination that the movement measurement information returns within the movement threshold.

12. The method of claim 11 wherein adjusting the shutter period comprises deactivating the shutter of the image sensor prior to expiration of the predetermined duration of the shutter period.

13. The method of claim 11 further comprising deactivating the shutter of the image sensor in response to a determination that the movement measurement information exceeds a maximum heading excursion, wherein the maximum heading excursion is larger than the movement threshold and represents a maximum movement of the image sensor that will be tolerated for a single image.

14. The method of claim 11 further comprising:
    generating an original image during at least a portion of the predetermined duration of the shutter period after activating and before deactivating the shutter of the image sensor, wherein at least some of the movement measurement information is based on image data obtained during the predetermined duration;
    generating a replacement image after reactivating the shutter of the image sensor, wherein the replacement image is generated during a reduced shutter period; and
    replacing the original image with the replacement image.

15. The method of claim 14 further comprising performing contrast equalization on the replacement image.

16. The method of claim 11 further comprising:
    generating an original image during at least a portion of the predetermined duration of the shutter period after activating and before deactivating the shutter of the image sensor; and modifying an exposure time of the original image after reactivating the shutter of the image sensor.

17. The method of claim 16 further comprising deactivating the shutter in response to expiration of a monitoring period after at least one modification of the exposure time of the original image.

18. A camera system with adaptive shutter control, the camera system comprising:
- means for obtaining movement measurement information during a shutter period, the movement measurement information indicative of a movement of an image sensor;
- means for adjusting the shutter period based on the movement measurement information;
- means for deactivating the shutter of the image sensor in response to a determination that the movement measurement information exceeds a movement threshold; and
- means for reactivating the shutter of the image sensor in response to a determination that the movement measurement information returns within the movement threshold.

19. The camera system of claim 18 further comprising:
- means for identifying a plurality of independent movement periods within a single monitoring period, wherein the plurality of independent movement periods are identified by the movement measurement information of the image sensor within a movement threshold; and
- means for accumulating an image signal for a single image over the plurality of independent movement periods.

20. The camera system of claim 18 further comprising:
- means for storing an original image from a first portion of the shutter period; and
- means for storing a replacement image from a second portion of the shutter period having a shorter duration than the first portion corresponding to the original image.

* * * * *